Oct. 16, 1951      A. A. BRANT      2,571,529

DRILL HOLE AND UNDERGROUND RESISTIVITY METHOD

Filed May 3, 1949

Inventor
Arthur A. Brant
by Douglas S. Johnson
Agent

Patented Oct. 16, 1951

2,571,529

UNITED STATES PATENT OFFICE 2,571,529

DRILL HOLE AND UNDERGROUND RESISTIVITY METHOD

Arthur A. Brant, Toronto, Ontario, Canada, assignor to Geophysical Exploration Company, New York, N. Y., a corporation of Delaware Application May 3, 1949, Serial No. 91,027

15 Claims. (Cl. 175—182)

1

This invention relates to a resistivity method for detecting subterranean bodies of conductivity varying from the general conductivity of the locale and locating their azimuth and distance relative the drill hole or other underground opening.

The principal object of the invention is to provide a reliable method which may be carried out with facility to detect a conductor anomaly, identify it as a good or poor conductor and locate it with a high degree of accuracy relative a drill hole or other underground opening.

A further object of the invention is to enable the extent of the anomaly to be determined.

A still further object is to provide a method which can be carried out with relatively inexpensive and easily portable equipment whereby investigation may be carried out with equal facility in difficult terrain and in cleared readily accessible areas.

The principal feature of the invention consists in electrifying the sub-surface with a direct current in three substantially orthogonal directions, one of which corresponds to the direction of a drill hole or other underground opening, measuring potentials along the drill hole with the sub-surface electrified in each of said three directions, and utilizing such measurements to determine the presence of conductor anomalies and azimuthal positions relative the drill hole or other underground opening.

A further feature of the invention consists in utilizing the potential readings down the drill hole to determine the depth of the anomaly, its distance from the drill hole and its approximate extent.

Referring to the drawings,

Figure 4 is a diagrammatic view for determining the anomalous potential function at any point in the medium created by the presence of

2 an anomaly having a conductivity differing from the medium in which it is embedded.

Figure 5:
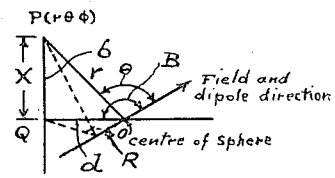

Figure 5 is a diagrammatic view by means of which the determination of the distance of the anomaly relative a drill hole can be determined.

In carrying out my method according to the drawings, I electrify the sub-surface 1 by means of the current electrodes 2 and 3 in contact with the earth and connected with the positive and negative terminals respectively of a direct current power supply 4, the meter 5 being arranged to indicate current flow between the electrodes.

These electrodes are spaced equi-distant from the drill hole or underground passage 6 and colinear therewith. The electrodes 2, 3 are described as in contact with the surface 7 and the underground passage 6 is defined as a drill hole, but it will be appreciated that the surface 7 may form a stope or drift or other underground opening, and the drill hole 6 may be any opening extending angularly from the surface 7, so that while my method may be primarily used from the surface it is equally applicable for investigating in mine shafts and other underground openings, including sewers, tunnels, subways and the like.

Figure 1:
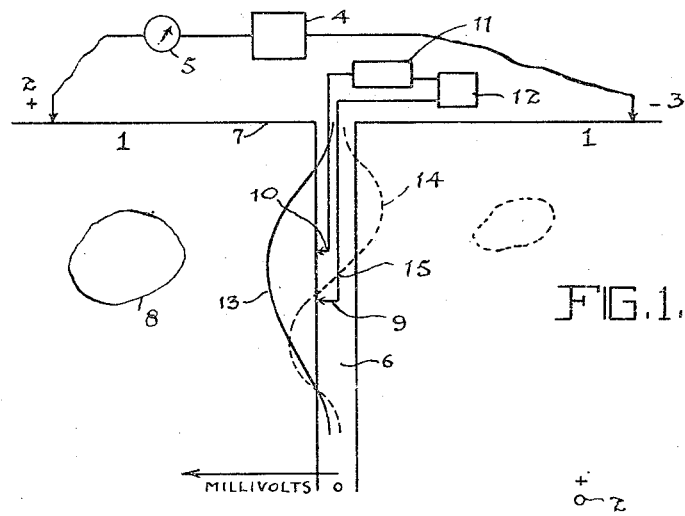
Figure 1 is a diagrammatic illustration of my method being carried out showing the manner in which potentials are measured along a drill hole or other underground opening leading from the surface, stope, or drift, with the sub-surface electrified in a direction substantially at right angles to the drill hole.

With the sub-surface electrified by means of the electrodes 2 and 3, as illustrated in Figure 1, the drill hole 6 lies on the right bisector of the line joining the current electrodes. Current electrodes 2 and 3 are spaced equally on either side of the drill hole 6 so that these electrodes and the top of the drill hole form a straight line, with the distance between the electrodes 2 and 3 being approximately 1.5 to 2 times the depth of the drill hole.

If a conductor anomaly 8 is present the normal field will be disturbed and there will be potential differences occurring at points along the hole.

To measure potentials along or down the hole the potential electrodes 9 and 10 are inserted in the hole and are connected to a voltage-recording device 11 and a voltage-compensating device 12 to balance out and record natural earth potentials.

The voltage recorder 11 indicates the voltage difference between the potential electrodes 9 and 10 due to the electrification of the sub-surface 1 and the presence of any anomaly. By adding the successive voltage differences the potentials at any point along the hole relative to the top of the hole can be determined.

If the subsurface material 1 is homogeneous, the axis of the vertical hole (or of any hole in the right bisector plane of electrodes 2 and 3) will be on an equipotential surface. In practice, one potential pick-up electrode 9 may be placed into the drill hole with the pick-up electrode 10 so far removed from the electrodes 2 and 3 that the potentials at electrode 10 are negligible. If the potential difference between the electrodes 9 and 10 are recorded, the values may be said to represent the potential at electrode 9, since by definition, the potential of any point equals the potential difference between that point and any other point an infinite distance away. This is achieved in practice by making the distance between the electrodes 2 and 10 at least 5 times the distance between the electrodes 2 and 9. Also the distance between the electrodes 3 and 10 is at least 5 times that of electrodes 3 to 9. Again, potential pick-up electrodes 9 and 10 can both be in the drill hole, or opening, with electrode 10 farther distant from current electrodes 2 and 3 than the potential electrode 9. In such case a potential difference reading between electrodes 9 and 10 is recorded, electrode 9 being connected to the positive terminal of the voltage recording device.

In all cases, the reading of the potential, or the potential difference, is made so that when electrode 2 is positive the potential of the electrode 10 is subtracted from that of the electrode 9.

In practice electrode 9 is generally placed within the drill hole, or opening, and electrode 10 is taken to a relatively great distance away, if possible, along the direction of the right bisector of the plane within which the electrodes 2, 9 and 3 lie. Thus, it is assured that the potential at electrode 10 is zero.

For the simple case of electrodes 2 and 3 lying on a horizontal plane equidistant on either side of the hole 6, if the medium 1 is homogeneous, then the potential difference between electrode 9 (anywhere in the hole) and electrode 10 (a great distance away) is zero.

Suppose, now, that an inhomogeneiety, such as the body 8, is located near and to one side of the hole 6. Since the main application is toward metalliferous deposits (which generally occur as finite pods or lenses) let us assume that the body 8 is of much higher conductivity than the medium 1 and lies on the side of the drill hole nearer the electrode 2. The equipotential surfaces will be distorted. That equipotential surface which would otherwise intersect the axis of the drill hole will be displaced toward electrode 3 opposite the body 8, and at this location the axis of the hole will intersect an equipotential surface of a higher positive value. Hence, if electrode 9 is moved along the hole and its potential difference measured relative to electrode 10 (at infinity), a series of voltage values will be obtained. These values, when plotted against the vertical distance along the drill hole, will give a curve such as the curve 13 shown in Figure 1. This curve is of essentially positive values opposite the body 8, expressing the series of potentials at the electrode 9 relative to a reference zero potential at the electrode 10. If electrodes 9 and 10 are both in the drill hole, with 9 above 10 (that is, electrode 9 nearer the current electrodes 2 and 3) and if the voltage difference between 9 and 10 is taken (the interval between 9 and 10 being kept constant), and 9 is connected to the positive terminal of the recorder, then the voltage difference so obtained, when plotted against the distance along the hole, will give the curve 14. The curve 14 shows that the voltage difference values so obtained are first negative and then positive as we go down the hole in the vicinity opposite the body 8.

Referring to the results exemplified by curve 13 we may conclude that if 2 is the + electrode with respect to 3, and if a series of potential readings are made in this symmetrically situated hole for a series of positions of 9 relative to a point of zero potential 10, giving a series of positive values along a portion of the hole, which values when plotted against position of 9, yield a curve of the form 13, then either a local better conductor lies on the side of the hole nearer 2 or a local poorer conductor lies on the side of the hole nearer 3.

Should the conductor anomaly be a poor conductor then the reverse is true and a negative potential will be recorded in the drill hole opposite the conductor with the curve 13 being reversed.

Again if the conductor anomaly 8 is a poor conductor the curve 14 will be reversed. Also if the conductor anomaly 8 is a good conductor but lies on the side of the drill hole 6 adjacent the negative current electrode 3 then the potential and potential difference curves 13 and 14 will be reversed.

By measuring the potentials down the drill hole as described to obtain the potential anomaly curve 13 the anomaly 8 is located as lying in quadrants on one side of the hole towards the positive current electrode 2.

Figure 2:
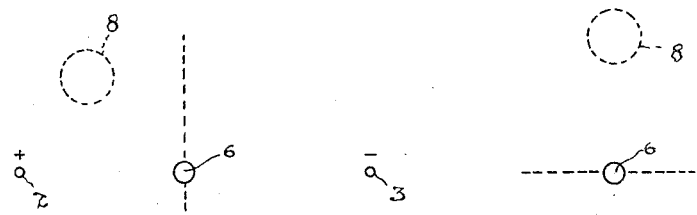
Figure 2 is a diagrammatic view showing the two steps of electrifying the sub-surface in two orthogonal directions to locate the quadrant in which the conductor anomaly lies.

The electrodes 2 and 3 are then moved through 90° as shown in Figure 2 to electrify the subsurface 1 in a direction orthogonal to the original direction. Again potential measurements down the drill hole 6 are taken and the indication of a positive potential down the drill hole will indicate that the conductor anomaly 8 lies on the side of the drill hole adjacent the positive electrode 2 in its new position of orientation. This determination will then locate the anomaly 8 within one quadrant relative the drill hole, and the values of the potential measurements may be utilized to determine approximately the position of the anomaly in the quadrant, for by comparing the results of set-up 1 and set-up 2 in Figure 2 their relative amplitudes will locate the conductor as being central or near one edge of the quadrant.

If a more accurate determination of the azimuthal position of the conductor anomaly be required the electrodes can again be rotated through 45° and the procedure to localize the azimuth to an octant in which it may be located with an accuracy of 22½°. For even greater accuracy the current electrodes may be rotated through 22½° and the procedure repeated.

This method will apply regardless of the shape of the disturbing body.

As an alternative to proceeding with the steps of rotating the electrodes through 45° and 22½° a mathematical determination may be made from the results obtained with the setups of Figure 2 to locate the actual position of the anomaly. The anomaly if of generally spherical shape can, with a mathematical treatment, be very accurately located.

As explained above, the same indications or readings given by a good conducting anomaly will be given by a poor conducting anomaly in a diametrically opposite location with respect to the drill hole.

Thus we know that if a conductor is present it is now in the quadrant defined by the electrode 2 in set-up No. 1, the mouth of the drill hole, and electrode 2 in set-up No. 2 (see Figure 2). If a poorer conductor is present, it must lie in the quadrant defined by the position of electrode 3 in set-up No. 1, the mouth of the drill hole, and electrode 3 in the set-up No. 2. From these surface investigations this duality condition cannot be resolved and one solution is as probable as the other.

In general the hole will not be in the right bisector plane of electrodes 2, 3, nor will the hole be vertical, i. e. perpendicular to the surface plane, which is a special case of the above. In general then, simply due to the fact that the electrode 9 is not equidistant from the electrodes 2 and 3 in space, there will be a potential at 9 relative to a point of zero potential at 10 even when the medium 1 is homogeneous. This potential at 9 in volts will be $$V_9 = \frac{\rho_1 I}{2\pi}\left(\frac{1}{r_1} - \frac{1}{r_2}\right)$$

where $\rho_1$ = the resistivity in ohms per cm. cube of medium 1.
$I$ = the current flowing into the ground at 2 in amperes.
$r_1, r_2$ = the distance of electrodes 2, 3 to electrode 9 in cms.

In general then, the results of the series of potential values for successive positions of electrode 9 in the hole relative to the point of zero potential 10, when plotted against distances along the hole, will be a smooth gradually changing curve on which will be superimposed the more rapid local variation such as exemplified by curve 13, Figure 1. This will be so since the exploratory drill holes 6 and the distances within the hole along which electrode 9 is moved will be great, in the order of hundreds of feet, compared to the average dimension and distance away of most conductor ore bodies, in the order of tens of feet, or at most, a few hundred feet. Moreover electrode 9 will be the order of hundreds of feet from electrodes 2 and 3, while only the order of tens of feet, or at most a few hundred feet, from the near edge of the anomalous body.

The gradual change in the potential values for the successive positions of electrode 9 due to the changing location of 9 relative to 2 and 3 can be computed from the above formula once, $\rho_1$, the resistivity of the pervading medium is known and these computed values can be subtracted from the observed values to reduce the reference potential, i. e. the gradual potential change on which the local effect of body 8 is superimposed, to zero. The remainder would then appear as curve 13 in Figure 1. In practice the superposition is frequently obviously apparent and it is not necessary to reduce the datum to zero as above.

Thus from any two successive set-ups the azimuthal location of a body may be determined within two diametrically opposite quadrants. First, electrodes 2 and 3 are located at equal distances on either side of the hole mouth, and potential measurements between a moveable electrode 9 within the hole and a point of zero potential are made. Next electrodes 2 and 3 are moved into a line at right angles to the first, the hole mouth still being at the centre of the line, and another series of potential readings are made by moving electrode 9 in the hole. In general the hole will be at some angle in space to the reference plane defined by the two set-ups and the potential readings will have to be reduced to an approximate zero datum by correcting, as outlined above, for that part of the potential due to electrode 9 being unequal distances from the electrodes 2 and 3 in a resistive medium.

The azimuthal location eventually determined will have a duality being either a finite better conductor than the medium 1, or a poorer conductor in the diametrically opposite quadrant.

Figure 3:
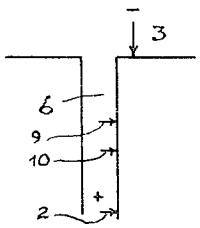
Figure 3 is a diagrammatic view illustrating the electrification of the sub-surface along the drill hole for determining the anomaly as a good or bad conductor.

To eliminate this duality and positively locate the anomaly the sub-surface is electrified along the drill hole, as shown in Figure 3. With the arrangement of Figure 3 the positive current electrode 2 is placed in the drill hole 6 adjacent the bottom of the hole or at the lower end of the portion to be investigated. The negative current electrode is placed at or near the top of the hole as shown at 3 whereby electrification is assured as nearly as possible along the hole.

If electrode 9 is used alone it is placed near electrode 2, at most a few hundred feet distant and usually less. If electrodes 9 and 10 are both placed into the hole 6, electrode 9 is kept nearer electrode 2 with the distance between electrodes 9 and 10 not greater than that between electrodes 2 and 9, and usually only a fraction thereof. The electrode array, 2, 9 and 10, if present, is moved up the hole while maintaining the interelectrode intervals just stated. Readings of the potential between electrodes 9 and 10 are taken at a series of stations up the drill hole.

Suppose, now, that actually a conductor anomaly is present and that readings of the potential difference are made with electrode 9 in the hole and electrode 10 far distant, as is done in practice. In this case when electrodes 2 and 9 are opposite the body 8 (when the line from the centre of 8 perpendicular the hole lies approximately between 2 and 9), a potential minimum will be recorded, i. e. the potential difference between electrodes 9 and 10 for 9 in this locality will be lower than for locations on the stretches of the hole on either side. Actually as electrodes 9 and 2 are moved up the hole a series of positive potential values relative to 10 will be obtained, but these if plotted against the successive positions of a point midway between 2 and 9, as they are moved along the hole, will show a minimum opposite the location of the body 8 if 8 is a conductor and a maximum if 8 is a relatively poorer conductor than medium 1. (This is true only as long as the distance between electrodes 2 and 9 is not greater than twice the distance to the body 8, hence, in general, this distance 2 to 9 is made equal to the expected distance to 8.) This is an expression merely of the decreased or increased apparent resistivity caused by the nearby better conductor or poorer conductor. Hence, the measurements involved for moving 9 and 2 up or down the hole are equivalent to an electric logging run.

If electrodes 9 and 10 are both within the hole the distance 2 to 9 is made about equal to the expected distance to the body 8, whereas the distance 9 to 10 is usually a fraction of this. Electrodes 2, 9 and 10 are moved along the hole, the relative spacings being maintained. If the potential values of electrode 9 above 10 are plotted relative to the series of positions of the mid point of electrodes 9 and 10 in the hole, the resulting curve will show a minimum opposite 8 if it is a better conductor and a maximum if it is a poorer conductor.

With the recording of the potentials obtained with the potential electrodes 9 and 10 in Figure 3 the lateral distance from the hole to the anomaly may be determined.

Figures 1 and 3 illustrate my method as being carried out particularly on a vertical drill hole leading from the surface or stope or drift.

In the case of a nearly horizontal hole underground and access to underground mine workings, setup 1 and setup 2 shown in Figure 2 are arranged in an approximately vertical plane perpendicular to the drill hole. The electrode configuration of setup 1 could have the current electrodes 2 and 3 in a drift or crosscut at the hole level, whereas for setup 2 of Figure 2 the current electrode could be in some mine working above the hole, and current electrode 3 could be at some level below the hole collar.

Thus electrification of the sub-surface is in two orthogonal directions and by measuring the potentials along the hole the quadrant of the anomaly relative the hole can be determined as explained above.

The electrification of the sub-surface in the direction of the hole can be carried out according to Figure 3 to eliminate the duality of a good or poor conducting anomaly.

For an inclined hole in place of either the vertical drill hole 6 or a horizontal drill hole, or other underground opening, setups 1 and 2 of Figure 2 would be duplicated. With the current electrodes located symmetrically with respect to the mouth of the inclined hole a normal potential curve can be calculated readily and then subtracted from the observations which will deviate from the calculated normal potential curve due to the presence of a conductor anomaly. From the observations obtained along the hole the azimuth of the anomaly can be determined as before.

The results obtained as outlined above can be readily verified by a mathematical analysis.

Figure 4:
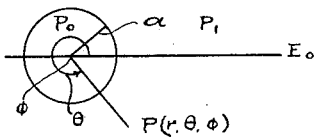

With reference to Figure 4, assume that an anomalous sphere of radius "$a$" conductivity $P_0$ imbedded in a homogeneous medium of conductivity $P_1$ and in a uniform electric field $E_0$, then the resultant potential (in spherical polar coordinates with $\theta$ axis along the field direction and origin O at the centre of the sphere) at a point $P(r,\theta,\phi)$ is $$Y = -E_0\left[r\cos\theta + \frac{P_0-P_1}{2P_0+P_1}\frac{a^3\cos\theta}{r^2}\right]$$

The original undisturbed potential function was $Y_0 = -E_0 r \cos\theta$. The anomalous potential function therefore is $$dY = -E_0\frac{P_0-P_1}{2P_0+P_1}\frac{a^3\cos\theta}{r^2}$$

For good conducting bodies $$\frac{P_0-P_1}{2P_0+P_1}$$

approaches $-1$ and for poor conducting bodies approaches $\frac{1}{2}$. Thus it will be seen that the presence of a conductor anomaly does alter the potential function and the nature of its conductivity (that is a good or bad conductor) determines whether the normal potential function is increased or decreased.

For a good conductor $$dY \text{ approaches } E_0\frac{\cos\theta}{r^2}a^3$$

which is greater than 0 with angle $\theta$ between 0° and 90° and is less than 0 with $\theta$ between 90° and 180°.

Hence the effect of the presence of a good conducting anomalous body in the current flow is to decrease the potential on the high potential side of the body and to increase the potential on the low potential side as described above. The effect of the presence of a poor conducting anomalous body is just the reverse to the good conductor but the magnitude of the effect is reduced by one half.

Thus it will be seen that the potential curve 13 obtained from the readings of the potentials down a drill hole as shown in Figure 1 showing an increasing potential at an intermediate distance down the hole indicates that the voltage electrodes were either on the low potential side of a good conducting body or on the high potential side of a poor conducting body.

The electrification of the sub-surface along the drill hole as explained solves this duality for with the electrode configuration of Figure 3, if the anomaly is a good conductor the potential adjacent the positive current electrode will be decreased and the potential adjacent the negative current electrode will be increased. If the anomaly is a poor conductor then the results will be reversed.

Hence the anomaly is determined as a good or poor conductor and is located in a quadrant with respect to the drill hole.

Actually the potentials down the drill hole can be utilized to determine the distance of the anomaly relative the drill hole.

As shown above the anomalous potential function is $$dY = -E\frac{(P_0-P_1)}{2P_0+P_1}\frac{a^3\cos\theta}{r^2}$$

From Figure 5 (with the subsurface electrified with the electrode configuration of Figure 1) $r^2 = x^2 + d^2$.

$$\cos\theta = \frac{d\cos B}{r}$$

since $$\cos B = \frac{t}{d}$$

$$\cos\theta = \frac{t}{r}$$

$$\frac{\cos\theta}{r^2} = \frac{d\cos B}{(x^2+d^2)^{3/2}}$$

where X represents distance measured to the potential point 9 $(r, \theta, \phi)$ along the drill hole 6 from the point Q the foot of the perpendicular $d$ dropped from the centre of the anomalous body (considered as spherical) onto the drill hole; B represents the angle between this perpendicular $d$ and the field direction at O; and P is a point $(r, \theta, \phi)$ on the drill hole, and $t$ is the distance R to O, R being obtained by dropping the perpendicular from P unto the line of the electric field direction through O.

Therefore for good conductor $$dY_P = E\frac{a^3 d \cos B}{(x^2+d^2)^{3/2}}$$

For P moving along the drill hole the potential gradient will be $$\frac{d}{dx}(dY_P) = K\frac{x}{(x^2+d^2)^{5/2}}$$

where K is a constant.

The maximum and minimum occur where $$\frac{x}{(x^{-2}+d^2)^{5/2}} = \text{max.} = F$$

Differentiating $$\frac{dF}{dx} = \frac{1}{(x^2+d^2)^{5/2}} - \frac{5\times 2}{(x^2+d^2)^{7/2}}$$

Setting this equation $d=0$ to obtain values of $x$ for which F is stationary $$x = \tfrac{1}{2}d$$

Therefore the linear separation between maximum and minimum points on the potential gradient curve is the distance $d$ of the centre of the disturbing body from the drill hole.

Other mathematics may be worked out for calculating the approximate size of the anomaly and to give other pertinent information required.

The potential gradient curve 14 thus serves as a means of determining the distance of the anomaly relative the drill hole by measuring the distance between maximum and minimum, and the zero point 15 of the curve 14 (i. e. where the curve 14 changes sign) gives the depth of the anomaly. The location of the anomaly to one side of the drill hole with the electrode configuration may be determined from curve 14 as well as curve 13 for the azimuthal determination.

It will be appreciated from the foregoing that my method will provide a high degree of accuracy and reliable means of determining and locating the presence of conductor anomalies.

The equipment required is readily portable and relatively inexpensive, and may be used on the surface or in any underground opening such as a mine drift, shaft, stope, tunnel or other formation.

It will be appreciated where several drill holes are in adjacent relation and observations are made down each of the holes that a further degree of accuracy in locating the anomaly and determining its depth and size is provided. The depth of the anomaly may be determined directly from the potential curve 13 with the potential anomaly having its maximum variation from the expected potential along the hole directly opposite the conductor anomaly.

The depth is calculated as described and tables of calculations may be computed to assist surveyors using my method who are not familiar with mathematical analysis.

It will be understood that the actual electrode configurations may be varied considerably from those described to provide the electrification of the sub-surface in different directions to indicate and locate an anomaly without departing from the scope of my invention.

It will be understood that where I use the term "drill hole" it is intended to encompass any underground opening, and I do not intend to limit myself to any specific type of underground opening by my use of the term "drill hole."

The use of my method is an important advance in the art of resistivity surveying enabling drill holes, which in themselves do not pass through conductor anomalies being sought, to provide a means of determining with accuracy and with facility the position of conductor anomalies adjacent thereto.

Such conductor anomalies may be good conducting sulphide ores or other bodies whose presence is desired to be known and which differ in conductivity from the general conductivity of the sub-surface.

Upon calculation of the approximate extent of the conductor body in its location a drill hole may then be sunk to intersect the conducting ore, eliminating the expensive, haphazard sinking of numerous test drill holes.

What I claim as my invention is:

1. An electrical potential method of drill hole exploration comprising sequentially electrifying the sub-surface with a direct current source in substantially orthogonal directions, measuring potentials along the drill hole with the sub-surface electrified in each such direction and plotting the potential measurements against distance along the drill hole, whereby the presence of a conductor anomaly and its azimuthal location relative the drill hole is at the point where such plotted potential measurements are a minimum.

2. An electrical potential method of drill hole exploration comprising electrifying the sub-surface with a direct current source by means of current electrodes spaced either side of a drill hole, measuring potentials along the drill hole to indicate the presence of a conductor anomaly and to locate it generally in one direction relative the drill hole, rotating the current electrodes to electrify the sub-surface in a substantially orthogonal direction, measuring potentials along the drill hole with the sub-surface electrified in said orthogonal direction to locate the azimuth of said anomaly, electrifying the sub-surface along said drill hole and measuring potentials along the drill hole with the sub-surface electrified in the direction of the hole to identify said anomaly as a good or poor conductor enabling its azimuthal locations to be confirmed.

3. A method of locating subterranean conductor anomalies comprising electrifying the sub-surface with direct current in three substantially orthogonal directions, measuring potential anomalies along a sub-surface passage created by the electrification of the sub-surface in each of said directions to identify the anomaly as a good or bad conductor enabling its location to be confirmed.

4. An electrical potential method of drill hole exploration comprising electrifying the sub-surface in two co-planar substantially orthogonal directions by means of current electrodes spaced either side of a drill hole and connected to a direct current source, measuring potentials along the drill hole for each direction of electrification to determine potential anomalies created by the presence of a conductor anomaly to determine the azimuthal location of said conductor anomaly relative the drill hole, electrifying the sub-surface with a direct current source along the drill hole and with the sub-surface electrified in said latter direction, measuring potential anomalies along the drill hole to determine the conductor anomaly as a good or poor conductor.

5. An electrical potential method of drill hole exploration comprising electrifying the sub-surface in two orthogonal directions by means of a direct current source and current electrodes located relative a drill hole whereby the drill hole coincides with the right bisector of a line joining said electrodes and forms an equi-potential surface for undisturbed electric fields created by said electrodes, electrifying the sub-surface along said drill hole, measuring potentials along said drill hole with the sub-surface electrified in said three directions to determine potential anomalies occasioned by the presence of a conductor anomaly disturbing said electric fields.

6. A method of drill hole exploration comprising sequentially electrifying the sub-surface in two co-planar directions substantially normal to the axis of a drill hole, and in a direction along the drill hole, obtaining a series of potential readings along spaced points in the drill hole, said potential readings being relative to a point of zero potential and such potential readings being taken for each direction of sub-surface electrification to establish the direction and distance of a conducting anomaly relative to the drill hole.

7. An electrical potential method of drill hole exploration comprising inserting a pair of current electrodes spaced an equal distance on either side of a drill hole, passing a D. C. current between said current electrodes, placing a first potential electrode a relatively great distance away along the direction of the right bisector of a line joining the two current electrodes, step-by-step placing of a second potential electrode in the drill hole at a series of spaced points, measuring the potential between the said potential electrodes for each position of said second potential electrode, placing the current electrodes into the drill hole and repeating the potential measurements between the potential electrodes to locate the position and distance of a conductor anomaly relative to the drill hole and to identify such anomaly as a good or a bad conductor.

8. The invention as recited in claim 7, wherein the spacing between said current electrodes is between 1.5–2.0 times the axial length of the drill hole.

9. A method of drill hole exploration comprising inserting a pair of current electrodes on either side of a drill hole, passing a D. C. current between said current electrodes, measuring the potential between a point $P_1$ placed at spaced points in the drill hole and a point of substantially zero potential, moving the current electrodes to a position displaced 90 degrees from the first position and obtaining similar potential readings between the various positions of point $P_1$ and a point of substantially zero potential, placing the current electrodes in the drill hole and repeating such potential readings thereby establishing an anomaly as a good or bad conductor and its position relative to the drill hole.

10. The invention as recited in claim 9, wherein the point of substantially zero potential is obtained by inserting a potential electrode at a point relatively far distant from the point $P_1$ and in a plane bisecting a line joining the said current electrodes.

11. A method of drill hole exploration comprising inserting a pair of current electrodes in the sub-surface on either side of a drill hole, passing a constant current between said current electrodes, placing a pair of pick-up electrodes in the drill hole and obtaining a series of potential measurements for several positions of the pick-up electrodes along the length of the drill hole, moving the current electrodes to a different angular position and repeating the potential measurements, moving the current electrodes so that one is within the drill hole and the other is in the sub-surface at the drill hole opening, and obtaining a series of potential measurements across the pick-up electrodes and along the drill hole while maintaining the original spacing between the pick-up electrodes and the said current electrode within the drill hole, thereby determining the location of an anomaly and its conductivity relative to that of the sub-surface.

12. A method of unequivocally determining the position and character of an anomaly in a medium, which method comprises electrifying the medium with a constant current by means of two current electrodes spaced on either side of a drill hole, obtaining a series of potential readings along the length of the drill hole and relative to a point at zero potential, from which the apparent location of the anomaly relative to a line drawn between said current electrodes is established, moving the current electrodes to electrify the medium in a substantially orthogonal direction and repeating the series of potential readings to thereby establish the quadrant location of the anomaly, moving the current electrodes to electrify the medium along the drill hole, and again repeating the potential readings, whereupon the maximum value of the latter potential readings serves to establish the azimuthal location of the anomaly with respect to the drill hole and to identify the anomaly as a good conductor.

13. The invention as recited in claim 12, wherein the minimum value of the latter potential readings serves to establish the azimuthal location of the anomaly and to identify such anomaly as a poor conductor.

14. A method for unequivocally determining the position and conductive character of an anomaly in a medium, which method comprises electrifying the medium with a constant current by means of two current electrodes spaced on either side of a drill hole, placing a pair of pick-up electrodes into contact with the medium along the drill hole, moving said pick-up electrodes along the drill hole and obtaining a curve of potential values relative to the length of the drill hole, moving the current electrodes to electrify the medium in a substantially orthogonal direction, repeating the procedure of moving the pick-up electrodes along the drill hole and obtaining another curve of potential values relative to the length of the drill hole, moving the current electrodes to electrify the medium along the drill hole one current electrode C being placed, for this purpose, into the drill hole and spaced below the two pick-up electrodes, moving the pick-up electrodes and the current electrode C along the drill hole while maintaining the original spacings between such electrodes, and obtaining a series of potential measurements between the pick-up electrodes as the three electrodes within the drill hole are moved to various positions along said drill hole, whereupon the maximum value of the latter potential readings serves to establish the azimuthal location of the anomaly and to identify such anomaly as a good conductor.

15. The invention as recited in claim 14, wherein the minimum value of the latter potential readings serves to establish the azimuthal location of the anomaly and to identify such anomaly as a poor conductor.

ARTHUR A. BRANT.

REFERENCES CITED

The following references are of record in the file of this patent:

UNITED STATES PATENTS

| Number | Name | Date |
|---|---|---|
| 2,440,693 | Lee | May 4, 1948 |